United States Patent
Andersson et al.

(10) Patent No.: US 11,057,626 B2
(45) Date of Patent: Jul. 6, 2021

(54) VIDEO PROCESSING DEVICE AND METHOD FOR DETERMINING MOTION METADATA FOR AN ENCODED VIDEO

(71) Applicant: Axis AB, Lund (SE)

(72) Inventors: Viktor A Andersson, Lund (SE); Moa Leonhardt, Lund (SE); Jonas Hakansson, Lund (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 16/665,234

(22) Filed: Oct. 28, 2019

(65) Prior Publication Data
US 2020/0137395 A1    Apr. 30, 2020

(30) Foreign Application Priority Data
Oct. 29, 2018   (EP) ..................... 18203038

(51) Int. Cl.
*H04N 19/137*   (2014.01)
*H04N 19/119*   (2014.01)
(Continued)

(52) U.S. Cl.
CPC ......... *H04N 19/137* (2014.11); *H04N 19/119* (2014.11); *H04N 19/159* (2014.11); *H04N 19/172* (2014.11)

(58) Field of Classification Search
CPC . G06T 2207/10016; G06T 2207/20021; G06T 7/223; G06T 7/254; H04N 19/119;
(Continued)

(56) References Cited

U.S. PATENT DOCUMENTS 5,126,841 A * 6/1992 Tanaka ............... H04N 7/141
                                              348/E7.078
2001/0002922 A1* 6/2001 Hayashi ............ H04N 19/533
                                              375/240.16
(Continued)

FOREIGN PATENT DOCUMENTS

WO    2010/033642 A2    3/2010

OTHER PUBLICATIONS

Szczerba et al., "Fast Compressed Domain Motion Detection in H.264 Video Streams for Video Surveillance Applications," 2009 Sixth IEEE International Conference on Advanced Video and Signal Based Surveillance, Genova, pp. 478-483 (2009).
(Continued)

*Primary Examiner* — Peter D Le
(74) *Attorney, Agent, or Firm* — Volpe Koenig

(57) ABSTRACT

A video processing device which generates motion metadata for encoded video comprises a decoder configured to decode frames of an encoded video into image frames; and a processing circuitry configured to execute a motion meta data deriving operation on image frames decoded by the decoder. The motion meta data deriving operation comprises: a dividing function configured to divide a current image frame into a mesh of cells, wherein each cell comprises multiple image pixels, a comparison function configured to determine a metric of change for each cell by comparing pixel data of each cell with pixel data of a correspondingly positioned cell of a previous and/or subsequent image frame, and a storing function configured to store the metric of change for each cell as the motion metadata related to the current image frame.

12 Claims, 3 Drawing Sheets

(51) Int. Cl.
*H04N 19/159* (2014.01)
*H04N 19/172* (2014.01)

(58) Field of Classification Search
CPC ... H04N 19/137; H04N 19/159; H04N 19/172
See application file for complete search history.

(56) References Cited

U.S. PATENT DOCUMENTS

| | | | | |
|---|---|---|---|---|
| 2001/0019586 A1* | 9/2001 | Kang | ............... | H04N 19/51 375/240.16 |
| 2001/0026590 A1* | 10/2001 | Kang | ............... | H04N 5/145 375/240.16 |
| 2002/0015513 A1* | 2/2002 | Ando | ............... | H04N 19/527 382/107 |
| 2002/0025001 A1* | 2/2002 | Ismaeil | ............... | H04N 19/156 375/240.16 |
| 2002/0027616 A1* | 3/2002 | Jun | ............... | H04N 19/503 348/578 |
| 2002/0036717 A1* | 3/2002 | Abiko | ............... | H04N 19/87 348/700 |
| 2002/0067432 A1* | 6/2002 | Kondo | ............... | G01R 23/09 348/576 |
| 2003/0053544 A1* | 3/2003 | Yasunari | ............... | H04N 19/137 375/240.16 |
| 2003/0072374 A1* | 4/2003 | Sohm | ............... | H04N 19/533 375/240.16 |
| 2003/0156644 A1* | 8/2003 | Song | ............... | H04N 19/112 375/240.13 |
| 2003/0228128 A1 | 12/2003 | Taylor et al. | | |
| 2004/0086047 A1* | 5/2004 | Kondo | ............... | H04N 19/137 375/240.16 |
| 2004/0236807 A1* | 11/2004 | Hsiung | ............... | H04N 5/265 708/200 |
| 2005/0117645 A1* | 6/2005 | Lin | ............... | H04N 19/114 375/240.16 |
| 2005/0123039 A1* | 6/2005 | Song | ............... | H04N 19/57 375/240.11 |
| 2005/0271144 A1* | 12/2005 | Yoshiwara | ............... | H04N 5/145 375/240.16 |
| 2006/0176962 A1* | 8/2006 | Arimura | ............... | H04N 19/14 375/240.24 |
| 2006/0282237 A1* | 12/2006 | Xiao | ............... | H04N 19/593 703/2 |
| 2007/0061696 A1 | 3/2007 | Vallone et al. | | |
| 2007/0183504 A1* | 8/2007 | Hoffman | ............... | G06T 7/223 375/240.16 |
| 2007/0242748 A1* | 10/2007 | Mahadevan | ............... | H04N 19/85 375/240.14 |
| 2008/0084491 A1* | 4/2008 | He | ............... | H04N 19/523 348/333.13 |
| 2008/0095242 A1* | 4/2008 | Lim | ............... | H04N 19/176 375/240.24 |
| 2008/0107180 A1* | 5/2008 | Lee | ............... | H04N 19/52 375/240.16 |
| 2008/0117975 A1* | 5/2008 | Sasai | ............... | H04N 19/59 375/240.16 |
| 2008/0152000 A1* | 6/2008 | Kaushik | ............... | H04N 19/132 375/240.03 |
| 2008/0165851 A1* | 7/2008 | Shi | ............... | H04N 19/139 375/240.16 |
| 2008/0247466 A1* | 10/2008 | Wang | ............... | H04N 19/109 375/240.16 |
| 2009/0074310 A1* | 3/2009 | Miaou | ............... | H04N 19/11 382/236 |
| 2009/0180538 A1* | 7/2009 | Visharam | ............... | H04N 19/147 375/240.15 |
| 2009/0190660 A1* | 7/2009 | Kusakabe | ............... | H04N 19/107 375/240.13 |
| 2011/0096840 A1* | 4/2011 | Sano | ............... | H04N 19/112 375/240.16 |
| 2011/0110429 A1* | 5/2011 | La | ............... | H04N 19/50 375/240.16 |
| 2011/0182362 A1* | 7/2011 | Kim | ............... | H04N 19/137 375/240.16 |
| 2013/0011072 A1* | 1/2013 | Miyoshi | ............... | H04N 19/103 382/197 |
| 2014/0192133 A1* | 7/2014 | Cheung | ............... | H04N 19/54 348/14.1 |
| 2014/0321548 A1* | 10/2014 | Park | ............... | H04N 19/139 375/240.16 |
| 2016/0042621 A1 | 2/2016 | Hogg et al. | | |
| 2016/0055381 A1 | 2/2016 | Adsumilli et al. | | |
| 2018/0012462 A1 | 1/2018 | Heitz, III et al. | | |
| 2018/0082429 A1 | 3/2018 | Choudhury et al. | | |

OTHER PUBLICATIONS

Liu et al., "Highway Vehicle Counting in Compressed Domain," 2016 IEEE Conference on Computer Vision and Pattern Recognition (CVPR), Las Vegas, NV, pp. 3016-3024 (2016).

Lievens et al., "Compressed-domain motion detection for efficient and error-resilient MPEG-2 to H.264 transcoding," Proc. SPIE 6696, Applications of Digital Image Processing XXX, 669609 (Sep. 24, 2007).

Patel, "Motion Detection and Segmentation in H.264 Compressed Domain for Video Surveillance Application," International Journal of Engineering Research & Technology (IJERT) vol. 03, Issue 04 (Apr. 2014).

Cisco Video Surveillance Manager User Guide, Release 6.3.2, Chapter 9, Using Smart Search (2011).

Pesquet-Popescu et al., "Motion Estimation Techniques," Multi-resolution representation (2013).

Extended European Search Report dated May 9, 2019 for the European Patent Application No. 18203038.7.

* cited by examiner

VIDEO PROCESSING DEVICE AND METHOD FOR DETERMINING MOTION METADATA FOR AN ENCODED VIDEO

TECHNICAL FIELD

The present invention relates to generation of motion metadata for a recorded video stream.

BACKGROUND

In order to find motion events in a recorded video, especially to identify motion in a specific area of a scene depicted in the recorded video, metadata about moving objects in the recorded video is often used. The recoded video may e.g. be recorded monitoring video. A known method for determining metadata about moving objects in the recorded video is to collect data about moving objects by a camera used for capturing the recorded video and store the collected data as metadata about moving objects in the recorded video. Such metadata may comprise information about location and/or size of a moving object in the recorded video. An example of such metadata is metadata collected by a Motion and Object Tracking Engine of the camera used for capturing the recorded video, so called MOTE-data.

However, metadata about moving objects in the recorded video collected by the camera used for capturing the video is not always available. This may be because the camera does not support collection of such metadata, or because a user turns off collection of such metadata.

An alternative or complement to the metadata about moving objects in the recorded video collected by a camera used for capturing the video is to use a frame by frame comparison of pixel changes. However, such frame by frame comparison must be performed every time a search for a motion event in the recorded video is to be performed. Hence, such frame by frame comparison is processor demanding and time consuming since it must be redone every time search parameters for finding a motion event in the recorded video is changed. Typical search parameters used is an area of interest within a scene of the recorded video and/or a size of a moving object to be found as the motion event. Further, the recorded video is typically stored in an encoded format, hence, in order to perform a frame by frame comparison of pixel changes, the recorded video need to be decoded. This will further add usage of processing power and time to the identification of motion in the recorded video.

Thus, there is a need for an alternative determination of motion metadata for a recorded video.

SUMMARY

According to a first aspect a method for identifying motion in an encoded video is provided. The method comprises decoding frames of the encoded video, thereby deriving image frames. The method further comprises for some or all the image frames: dividing a current image frame into a mesh of cells, each cell comprising multiple image pixels, determining a metric of change for each cell by comparing pixel data of each cell with pixel data of a correspondingly positioned cell of a previous and/or subsequent image frame, and storing the metric of change for each cell as motion metadata related to the current image frame. The method further comprises setting a first region of interest of a scene depicted by the encoded video; setting a first motion threshold; accessing the stored motion metadata; and identifying image frames for which the metric of change in one or more cells overlapping with the first region of interest exceeds the first motion threshold. Thereby motion within the first region of interest and hence in the encoded video is identified.

By the present method processing power usage in connection with search for motion events in recorded video may be saved. This since reuse of the frame by frame comparison is made possible. The frame by frame comparison is only needed to be performed once. The same motion metadata may be searched multiple time using different regions of interest and/or different motion thresholds.

The method may further comprise: changing the first motion threshold; and identifying image frames for which the metric of change in cells overlapping with the first region of interest exceeds the changed first motion threshold. Thereby motion within the first region of interest and hence in the encoded video is identified.

The method may further comprise: setting a second region of interest of the scene, in addition to or as a replacement for the first region of interest; setting a second motion threshold, wherein the first and second motion threshold are the same or different; and identifying image frames for which the metric of change in cells overlapping with the second region of interest exceeds the second motion threshold. Thereby motion within the second region of interest and hence in the encoded video is identified.

Each cell may span less than five percent of the image frame. By doing so, the number of cells can be tuned to get a good balance of performance versus accuracy.

The step of determining a metric of change may further comprise: identifying cells within the image frame for which the metric of change exceeds a change threshold; and, for each identified cell, determining a number of adjacent cells for which the metric of change exceeds the change threshold. Wherein the motion metadata further may further comprise, for each identified cell, the number of adjacent cells for which the metric of change exceeds the change threshold. This allow for, in the motion metadata, providing an estimation of a size of a moving object.

The image frames for which motion metadata is determined may correspond to intra coded frames of the encoded video. This may speed up the decoding of the encoded video since only some of the frames of the encoded video need to be decoded. Further, it may speed up the determination of the motion metadata since not all the data of the encoded video need to be analyzed.

The image frames corresponding to prediction coded frames of the encoded video stream may be exempt from the determination of motion metadata.

According to a second aspect a non-transitory computer readable recording medium is provided. The on-transitory computer readable recording medium having recorded thereon program code which when executed at a device having processing capabilities is configured to perform the method according to first aspect.

According to a third aspect a method for determining motion metadata for an encoded video is provided. The method comprising: decoding frames of the encoded video, thereby deriving image frames; for some or all the image frames: dividing a current image frame into a mesh of cells, each cell comprising multiple image pixels, determining a metric of change for each cell by comparing pixel data of each cell with pixel data of a correspondingly positioned cell of a previous and/or subsequent image frame, and storing the metric of change for each cell as motion metadata related to the current image frame.

The step of determining a metric of change may further comprise: identifying cells within the current image frame for which the metric of change exceeds a change threshold, and for each identified cell, determining a number of adjacent cells for which the metric of change exceeds the change threshold. Wherein the motion metadata may further comprise, for each identified cell, the number of adjacent cells for which the metric of change exceeds the change threshold.

The above mentioned features of the method of the first aspect, when applicable, apply to this method according to the third aspect as well. In order to avoid undue repetition, reference is made to the above.

According to a forth aspect a non-transitory computer readable recording medium is provided. The non-transitory computer readable recording medium having recorded thereon program code which when executed at a device having processing capabilities is configured to perform the method according to the third aspect.

According to a fifth aspect a video processing device is provided. The video processing comprising: a decoder configured to decode frames of an encoded video into image frames; and a processing circuitry configured to execute a motion meta data deriving operation on image frames decoded by the decoder. The motion meta data deriving operation comprises: a dividing function configured to divide a current image frame into a mesh of cells, wherein each cell comprises multiple image pixels, a comparison function configured to determine a metric of change for each cell by comparing pixel data of each cell with pixel data of a correspondingly positioned cell of a previous and/or subsequent image frame, and a storing function configured to store the metric of change for each cell as the motion metadata related to the current image frame.

The motion meta data deriving operation may further comprise a cell identification function configured to: identify cells within the current image frame for which the metric of change exceeds a change threshold; for each identified, determining a number of adjacent cells for which the metric of change exceeds the change threshold; and add the determined number of adjacent cells for which the metric of change exceeds the change threshold as part of the motion metadata for the identified cell.

The video processing device may form part of a video storage server configured to store the encoded video. The video processing device may then further comprise a resource monitor configured to determine available processing power for the processing circuitry, and upon the available processing power being above a threshold instruct the motion meta data deriving operation to determine the motion metadata. Hence, down periods of the video storage server may be utilized for deriving the motion metadata for encoded video stored on the video storage server.

The video processing device may form part of a client computer. The video processing device may then further comprise a transceiver configured to download the encoded video from an external source device. Wherein the storing function may then further be configured to upload the motion metadata to the external source device. Motion metadata derived by a client computer may hence be reused by other client computers or by the video storage server for later identification of motion in the encoded video for which the client computer derived the motion metadata.

The above mentioned features of the method of the first aspect, when applicable, apply to the video processing device according to the fifth aspect as well. In order to avoid undue repetition, reference is made to the above.

A further scope of applicability of the present embodiments will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures showing embodiments. The figures should not be considered limiting; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present teachings will now be described more fully hereinafter with reference to the accompanying drawings, in which currently preferred embodiments are shown. This however, may be embodied in many different forms and should not be construed as limited to the embodiments set forth herein; rather, these embodiments are provided for thoroughness and completeness, and to fully convey the scope to the skilled person.

Figure 1:
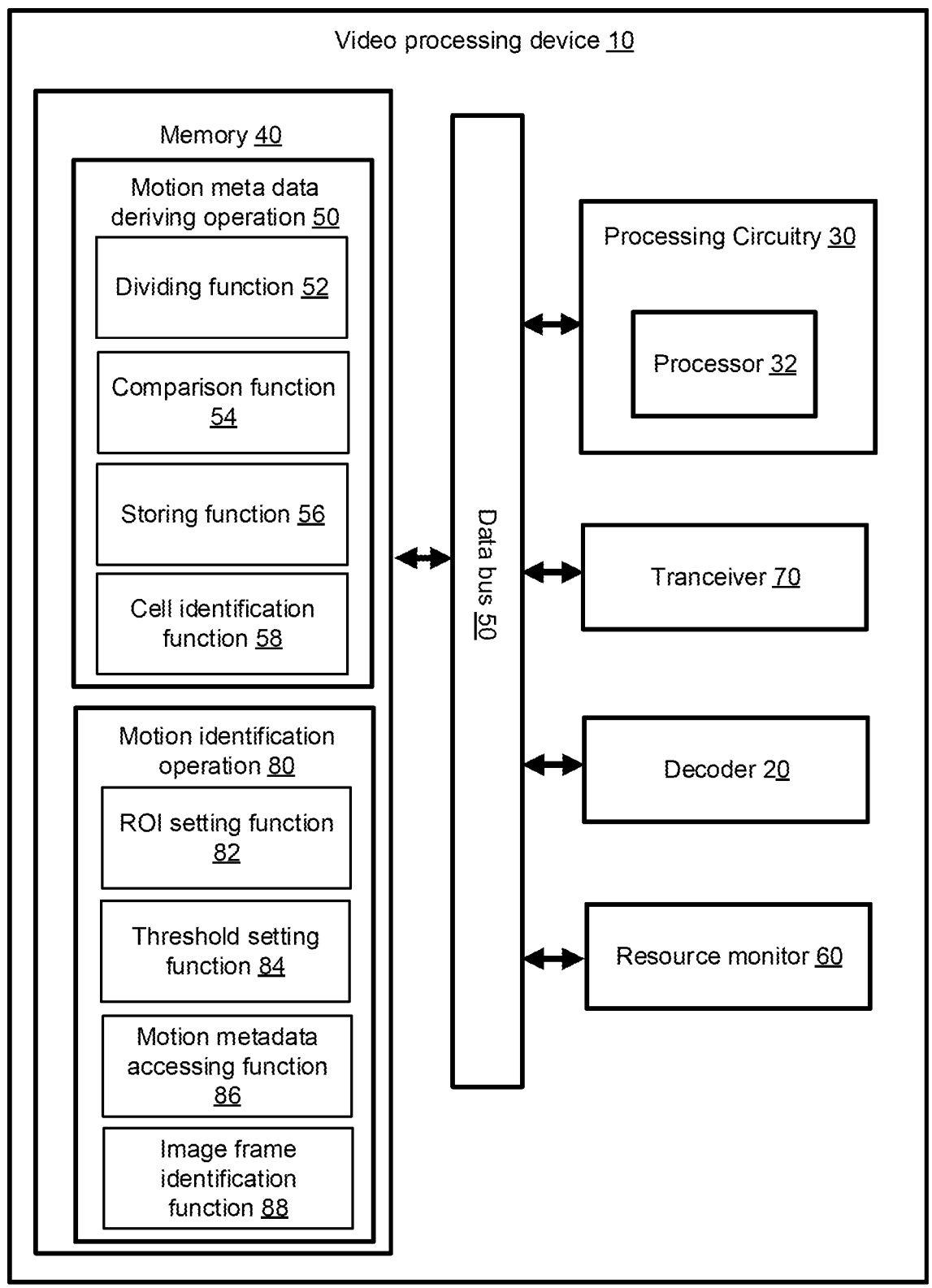
FIG. 1 illustrate a video processing device.

FIG. 1 illustrates a video processing device 10. The video processing device 10 is configured to determine motion metadata for an encoded video. The video processing device 10 may further be configured to identify motion in the encoded video. The encoded video is depicting a scene. The encoded video may e.g. be monitoring video. The encoded video is typically stored as a recorded encoded video.

The video processing device 10 may form part of a video storage server. The video storage server may be configured to store encoded video. The video storage server may be configured to process encoded video. A video processing device 10 forming part of a video storage server will be discussed in more detail below.

Alternatively, the video processing device 10 may form part of a client computer. The client computer may be configured to download encoded video from a video storage server. The client computer may process encoded video. A video processing device 10 forming part of a client computer will be discussed in more detail below.

The video processing device 10 comprises a decoder 20, a processing circuitry 30 and a memory 40. The features and function of the decoder 20, the processing circuitry 30 and the memory 40 will now be discussed.

The memory 40 may be one or more of a buffer, a flash memory, a hard drive, a removable media, a volatile memory, a non-volatile memory, a random access memory (RAM), or another suitable device. In a typical arrangement, the memory 40 may include a non-volatile memory for long term data storage and a volatile memory that acts as system memory for the processing circuitry 30. The memory 40 may exchange data with the processing circuitry 30 over a data bus 50. Accompanying control lines and an address bus between the memory 40 and the processing circuitry 30 also may be present.

The encoded video may be stored on the memory 40 of the video processing device 10. Alternatively, the video processing device 10 may receive the encoded video from a device external from the video processing device 10.

The decoder 20 is configured to decode frames of the encoded video into image frames. Each image frame is represented by a plurality of image pixels. The decoded image frames may be stored on the memory 40 of the video processing device 10. Decoding of frames of an encoded video into image frames is well known to a person skilled in the art and will not be discussed in any detail in this disclosure. The complete encoded video may be decoded. Hence, all the frames of the encoded video may be decoded into image frames. Alternatively, only a portion of the complete encoded video may be decoded. Hence, only some of the frames of the encoded video may be decoded into image frames. According to one example, only the intra encoded frames (e.g. I-frames) of the encoded video may be decoded. Hence, the prediction coded frames (e.g. P- and/or B-frames) may be exempt from the decoding. The video processing device 10 is configured to determine motion metadata for some or all image frames decoded by the decoder 20.

The processing circuitry 30 is configured to carry out operations and functions of the video processing device 10. Operations may be main procedures of the video processing device 10. Whereas the functions may be forming part of an operation. Hence, each function may be a sub-procedure of an operation.

The processing circuitry 30 may include a processor 32, such as a central processing unit (CPU), microcontroller, or microprocessor. The processor 32 is configured to execute program code stored in the memory 40, in order to carry out the operations and functions of the video processing device 10.

Operations and functions of the video processing device 10 may be embodied in the form of executable logic routines (e.g., lines of code, software programs, etc.) that are stored on a non-transitory computer readable medium (e.g., the memory 40) of the video processing device 10 and are executed by the processing circuitry 30 (e.g., using the processor 32). Furthermore, the operations and functions of the video processing device 10 may be a stand-alone software application or form a part of a software application that carries out additional tasks related to the video processing device 10. The described operations and functions may be considered a method that the corresponding device is configured to carry out. Also, while the described operations and functions may be implemented in software, such functionality may as well be carried out via dedicated hardware or firmware, or some combination of hardware, firmware and/or software.

The processing circuitry 30 is configured to execute a motion meta data deriving operation 50. The motion meta data deriving operation 50 is configured to use image frames decoded by the decoder 30 as input data. The input data may be image frames corresponding to intra coded frames (e.g. I-frames) of the encoded video. Further, image frames corresponding to prediction coded frames (e.g. P- or B-frames) of the encoded video stream may be exempt from the input data.

The motion meta data deriving operation 50 comprises a dividing function 52, a comparison function 54, storing function 56. The motion meta data deriving operation 50 is configured to process the image frames corresponding to the input data to derive motion meta data for each such image frames.

Figure 2:
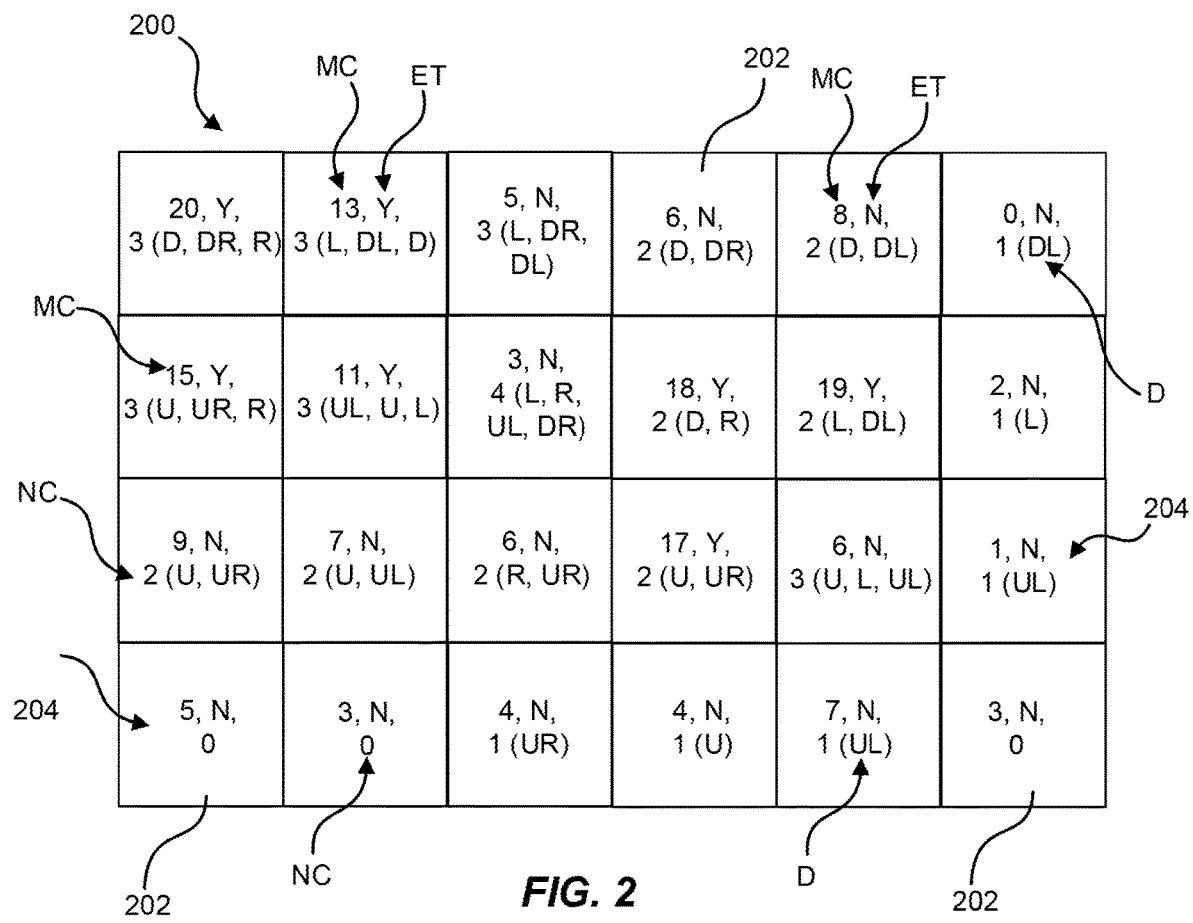
FIG. 2 illustrate motion metadata related to cells of an image frame.

The dividing function 52 is configured to divide a current image frame of the input data into a mesh of cells. The mesh of cells may be predetermined. This is illustrated in connection with FIG. 2 wherein a current image frame 200 is divided into a mesh of cells. In the example of FIG. 2 the mesh of cells comprises 24 cells 202. Each cell 202 of the mesh of cells comprises multiple image pixels. Each cell may comprise an equal amount of image pixels. Preferably, the whole image frame is covered by the mesh of cells. Each cell may be rectangular, especially quadratic. Each cell may span less than five percent of the image frame. By doing so, the number of cells can be tuned to get at good balance of performance versus accuracy.

The size of each cell may also be related to a mean size of region of interests in the scene. For example, the size of each cell may be chosen such that a mean sized region of interest is covered by a plurality of cells.

The size of each cell may also be related to a mean size of moving objects in the scene. For example, the size of each cell may be chosen such that a mean sized object is covered by a plurality of cells.

Further, the size of the cells in the mesh of cells may vary. The variation in size may be dependent upon barrel distortion present in the image frames.

The comparison function 54 is configured to determine a metric of change for each cell of the current image frame. This is done by comparing pixel data of each cell with pixel data of a correspondingly positioned cell of a previous and/or subsequent image frame. The previous and/or subsequent image frame used for the pixel comparison is another image frame of the input data being the input to the motion meta data deriving operation 50. The metric of change may be determined in different ways. For example, the metric of change for a cell of the current image frame may be a measure of the number of pixels within the cell that has changed. Alternatively, or in combination, the metric of change for a cell of the current image frame may be a combined change for all pixels within the cell. The change of every pixel may e.g. be in the form of a Euclidian distance or a change in a luminosity equivalent.

The storing function 56 is configured to store the metric of change for each cell of the current image frame as motion metadata. The storing function 56 is further configured to relate the motion metadata to the current image frame 200. By relate is here meant relate in in time. The motion metadata may be seen as motion metadata for a time period corresponding to the time period when image data of the current image frame, and possibly also image frames just before and/or just after the current image frame, was captured. The motion metadata may be stored in a metadata portion of the current video frame. Alternatively, or in combination, the motion metadata may be stored in a metadata portion of the encoded video from which the stream of image frames has been decoded. Alternatively, or in combination, the motion metadata may be stored in a separate file.

The motion metadata may also comprise time information related to the encoded video. The motion metadata may further comprise information related to an identity of the camera that was used for capturing the encoded video.

The motion meta data deriving operation 50 may further comprise a cell identification function 58. The cell identification function 58 is configured to identify cells within the current image frame for which the metric of change exceeds a change threshold. The change threshold may be a predetermined fixed threshold. Alternatively, the change threshold may be an adjustable threshold. The cell identification function 58 may further be configured to, for each cell (preferably for each identified cell), determine a number of adjacent cells for which the metric of change exceeds the change threshold.

By adjacent cells is here meant cells bordering the identified cell. A cell is bordering another cell if the cell is directly above, directly below, directly to the right, directly to the left, or directly diagonal (in any of the four different diagonal directions) of that cell. The motion metadata may in such case further comprise, for each identified cell, the number of adjacent cells for which the metric of change exceeds the change threshold. This is further discussed below in connection with FIG. 2.

The cell identification function 58 may further be configured to add, for each cell (preferably each identified cell), the determined number of adjacent cells for which the metric of change exceeds the change threshold as part of the motion metadata for the identified cell. Hence, for each cell (preferably each identified cell) the metadata may comprise the metric of change for the cell and the number of adjacent cells for which the metric of change exceeds the change threshold. Further, for each identified cell the metadata may further comprise a flag indicating that the metric of change exceeds the change threshold. The cell identification function 58 may further be configured to, for each cell (preferably each identified cell), determine for which of the adjacent cells the metric of change exceeds the change threshold. This data may also be added to the motion metadata.

With reference to FIG. 2, different possible portions of the motion metadata 204 for a cell 202 of a current image frame 200 will be exemplified. The first portion of data in the motion metadata 204, indicated as MC in FIG. 2, relate to the metric of change for the cell. In the example of FIG. 2, the metric of change is a measure of the number of pixels within the cell that has changed. The second portion of data in the motion metadata 204, indicated as ET in FIG. 2, relate to a flag indicating if the metric of change exceeds the change threshold for the cell 202. In the example of FIG. 2, the flag is a binary flag stating yes, Y, if the metric of change for the cell exceeds the change threshold, or stating no, N, if the metric of change for the cell does not exceed the change threshold. In this example the change threshold is set to be 10. Instead of using Y or N a binary flag 1 or 0 may be used. The third portion of data in the motion metadata 204, indicated as NC in FIG. 2, relate to the number of adjacent cells for which the metric of change exceeds the change threshold. The adjacent cells may be any neighboring cells. The number of adjacent cells for which the metric of change exceeds the change threshold may range from 0 to 8. The fourth portion of data in the motion metadata 204, indicated as D in FIG. 2, relate to which adjacent cells has a metric of change that exceeds the change threshold. The fourth portion of data D is the data within the brackets ( ) of the motion metadata as indicated in FIG. 2. The fourth portion of data D may have zero to eight entries. Each entry of the fourth portion of data D indicates a direction to an adjacent cell that has a metric of change that exceeds the change threshold. In FIG. 2 the different entries of the fourth portion of data D are exemplified as U (Up), D (Down), L (Left), R (Right), UL (diagonally Up Left), UR (diagonally Up Right), DL (diagonally Down Left) or DR (diagonally Down Right).

As mentioned above the video processing device 10 may form part of a video storage server. In such case the video storage server may be configured to store the recorded video for which the motion metadata is to be determined. The recorded video is then typically stored in an encoded format. The encoded recorded video is typically stored in the memory 40 of the video storage server. After determination of the motion metadata, the storing function 56 may be configured to store the motion metadata in the memory 40 of the video storage server. The video storage server may further comprise a resource monitor 60. The resource monitor 60 is configured to determine available processing power for the processing circuitry 30. The resource monitor 60 is further configured to, upon the available processing power being above a threshold, instruct the motion meta data deriving operation 50 to determine the motion metadata.

Further, as mentioned above, the video processing device 10 may form part of a client computer. The client computer may be configured to download the recorded video for which the motion metadata is to be determined from an external source device. Such an external source device may be a video storage server configured to store the recorded video. Typically, the downloaded recorded video is received in an encoded format. Hence, the client computer may be configured to download an encoded recorded video for which the motion metadata is to be determined. Hence, the video processing device 10 may further comprise a transceiver 70. The transceiver 70 is configured to communicate with the external source device. That said, such external source device also comprises a transceiver for communicating with the video processing device 10. The communications may include data transfers, and the like. Data transfers may include, but are not limited to, downloading and/or uploading data and receiving or sending messages.

In case the video processing device 10 form part of a client computer the storing function 56 may be configured to upload the motion metadata to the external source device. The uploading may form, part of the storing of the motion metadata.

The video processing device 10 may further be configured to identify motion in the encoded video utilizing the determined motion metadata. For this purpose, the video processing device 10 comprises a motion identification operation 80. The motion identification operation 80 comprises a region of interest setting function 82, a threshold setting function 84, a motion metadata accessing function 86, and an image frame identification function 88. The motion identification operation 80 is configured to process the encoded video and the motion metadata derived by the motion metadata deriving operation 50.

Figure 3:
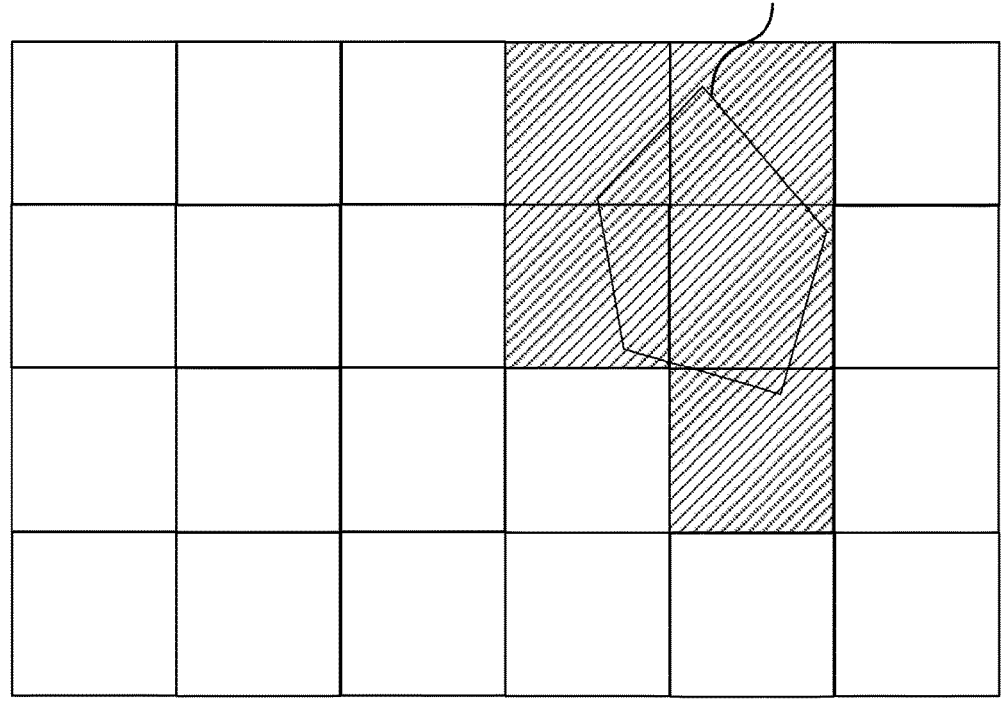
FIG. 3 illustrate an overlap between a marked region of interest and cells of an image frame divided into a mesh of cells.

The region of interest, ROI, setting function 82 is configured to set a ROI within the scene depicted by the encoded video. Typically, this is achieved by receiving ROI input data corresponding to a region of the scene being of interest. The ROI input data may e.g. be determined by receiving input data regarding an area of an image frame, corresponding to a frame of the encoded video, being marked in a graphical user interface. The ROI setting function 82 may further be configured to identify cells of the mesh of cells overlapping with the ROI. This is illustrated in FIG. 3 wherein a ROI 310 is marked as a polygon and five cells (indicated by a diagonal pattern) are found to overlap with the ROI 310. Hence, a portion of the cells are marked as being of interest to study further.

The threshold setting function 84 is configured to set a motion threshold. The motion threshold is related to the metric of change. Hence, if the metric of change in a cell is determined to be above the motion threshold, motion is said to have been identified. The threshold setting function 84 may be configured to set a common motion threshold for all the cells overlapping with the ROI 310. Alternatively, the threshold setting function 84 may be configured to set individual motion thresholds for the cells overlapping with the ROI 310.

The motion metadata accessing function 86 is configured to access the stored motion metadata for the cells overlapping with the ROI 310. The motion metadata may be accessed for image frames of the recorded video corresponding to a time period of the entire encoded video. Alternatively, the motion metadata may be accessed for image frames of the encoded video corresponding to a portion of the time period of the entire encoded video.

The image frame identification function 88 is configured to identify cells overlapping with the ROI for which the metric of change exceeds the motion threshold for each cell. As mentioned above, all cells overlapping with the ROI may have the same motion threshold, i.e. the motion threshold is common for all the cells overlapping with the ROI. Alternatively, as also mentioned above, each cell overlapping with the ROI may have an individual motion threshold. The image frame identification function 88 is further configured to, based on the identified cells, identify image frames of the recorded video for which the metric of change in one or more cells overlapping with the ROI exceeds the motion threshold. Thereby, motion within the ROI have been identified.

The image frame identification function 88 may be configured to identify an image frame as being an image frame wherein motion within the ROI have occurred in different ways. It may be that motion is identified if one of the cells overlapping with the ROI comprises a metric of change exceeding the to the respective cell associated motion threshold. It may be that motion is identified if a portion of the cells overlapping with the ROI comprises a metric of change exceeding the to the respective cell associated motion threshold. The portion may be a percentage of the cell, e.g. 25%, 50% or 75% of the cells. It may be that motion is identified if all of the cells overlapping with the ROI comprises a metric of change exceeding the to the respective cell associated motion threshold. It may be that motion is identified if two or more adjacent cells of the cells overlapping with the ROI comprises a metric of change exceeding the to the respective cell associated motion threshold.

The identified image frames may further be correlated with a time stamp within the encoded video. Hence, the image frame identification function 88 may further be configured to identify at what time in the encoded video the motion has been identified.

The motion identification operation 80 may be configured to identify motion under the criteria that a plurality of consecutive image frames, identified by the image frame identification function 88 as being image frames wherein motion within the ROI have occurred, shall have been identified.

Figure 4:
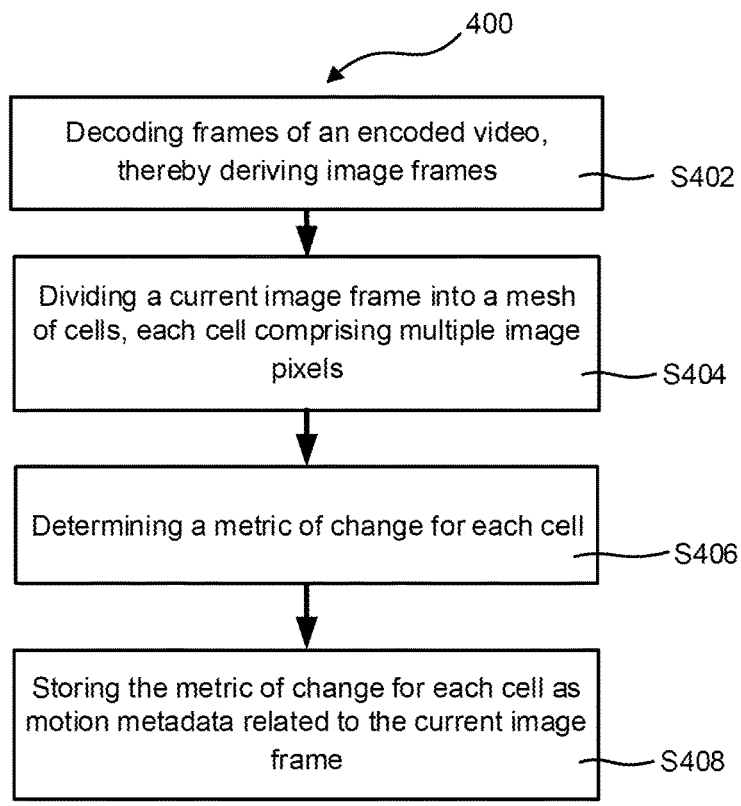
FIG. 4 is a block scheme of a method for determining motion metadata for an encoded video.

With reference to FIG. 4 a method 400 for determining motion metadata for an encoded video will be discussed. The encoded video is preferably an already recorded video. The encoded video may e.g. be stored on a video storage server. The method comprises deriving image frames by decoding S402 frames of the encoded video. All or some of the encoded frames of the encoded video may be decoded. Further, for all or some of the image frames, motion metadata is to be determined and stored in accordance with the following steps. Dividing S404 a current image frame into a mesh of cells. The mesh of cells may be a predetermined mesh of cells. Each cell in the mesh of cells comprises multiple image pixels. The step of dividing S404 a current image frame into a mesh of cells was discussed in more detail above in connection with the dividing function 52 of the motion meta data deriving operation 50. Determining S406 a metric of change for each cell. The step of determining S406 the metric of change for each cell comprises comparing pixel data of each cell with pixel data of a correspondingly positioned cell of a previous and/or subsequent image frame. The previous and/or subsequent image frame being previous and/or subsequent to the current image frame. The step of determining S406 a metric of change for each cell was discussed in more detail above in connection with the comparison function 54 of the motion meta data deriving operation 50. Storing S408 the metric of change for each cell as motion metadata related to the current image frame. The step of storing S408 the metric of change for each cell as motion metadata related to the current image frame was discussed in more detail above in connection with the storing function 56 of the motion meta data deriving operation 50.

The image frames for which motion metadata is determined and stored may be the image frames that corresponds to intra coded frames of the encoded video. Further, image frames corresponding to prediction coded frames of the encoded video may be exempt from the determination of motion metadata.

The step of determining S406 the metric of change for each cell may further comprise identifying cells within the current image frame for which the metric of change exceeds a change threshold, and, for each identified cell, determining a number of adjacent cells for which the metric of change exceeds the change threshold. This was discussed in more detail above in connection with the cell identification function 58 of the motion meta data deriving operation 50.

Figure 5:
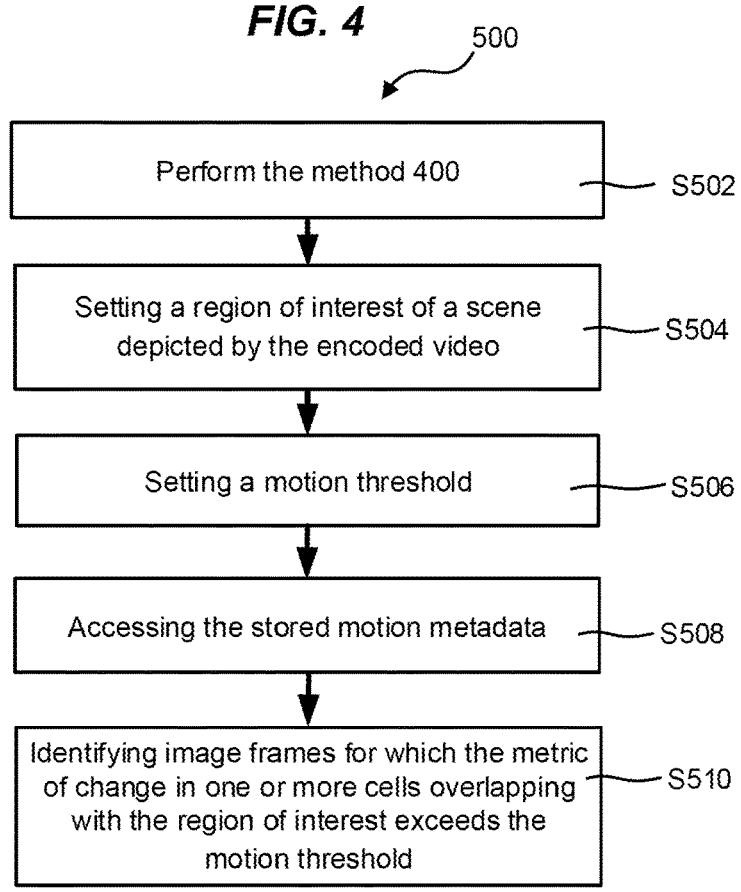
FIG. 5 is a block scheme of a method for identifying motion in an encoded video.

With reference to FIG. 5 a method 500 for identifying motion in an encoded video will be discussed. The method comprises the following steps. Performing S502 the method 400 for determining the motion metadata for the encoded video. Hence, determining and storing motion metadata for the encoded video. Setting S504 a region of interest of a scene depicted by the encoded video. The step of setting S504 a region of interest was discussed in more detail above in connection with the region of interest setting function 82 of the motion identification operation 80. Setting S506 a motion threshold. The step of setting S506 a motion threshold was discussed in more detail above in connection with the threshold setting function 84 of the motion identification operation 80. Accessing S508 the stored motion metadata. The step of accessing S508 the stored motion metadata was discussed in more detail above in connection with the motion metadata accessing function 86 of the motion identification operation 80. Identifying S510 image frames for which the metric of change in one or more cells overlapping with the region of interest exceeds the motion threshold. The step of identifying S510 image frames was discussed in more detail above in connection with the image frame identification function 88 of the motion identification operation 80. Thereby motion within the region of interest is identified and hence also motion in the encoded video is identified.

The method 500 for identifying motion in the encoded video may further comprise. Changing the motion threshold and identifying image frames for which the metric of change in cells corresponding to the region of interest exceeds the changed motion threshold.

The person skilled in the art realizes that the teachings herein are by no means limited to the preferred embodiments described above. On the contrary, many modifications and variations are possible within the scope of the appended claims.

For example, the method 500 for identifying motion in the encoded video may further comprise setting another region of interest of the scene. The another region of interest of the scene may be set in addition to or as a replacement for the original region of interest. Also another motion threshold, different from the motion threshold used for the original region of interest, may be set for the another region of interest. However, the same motion threshold as used for the original region of interest may be used for the another region of interest. Then, image frames for which the metric of change in cells overlapping with the another region of interest exceeding the motion threshold used for the another region of interest may be identified. Thereby motion within the another region of interest is identified and hence also motion in the encoded video is identified.

Further, method 500 for identifying motion in the encoded video may further comprise setting an exclusion area. Motion found in the exclusion area may be disregarded in the method 500 for identifying motion in the encoded video. The exclusion area may overlap, partly of fully, with a set region of interest. For example, the exclusion area may be used for excluding motion in an area where a tree, flag, etc. is blowing in the wind. Hence, the exclusion area may be used for excluding uninteresting areas of the scene.

Additionally, variations to the disclosed embodiments can be understood and effected by the skilled person in practicing the claimed invention, from a study of the drawings, the disclosure, and the appended claims.

The invention claimed is:

1. A method for identifying motion in an encoded video, the method comprising:
   decoding frames of the encoded video, thereby deriving image frames;
   for at least some of the image frames:
      dividing a current image frame into a mesh of cells, each cell comprising multiple image pixels,
      determining a metric of change for each cell by:
         comparing pixel data of each cell with pixel data of a correspondingly positioned cell of a previous and/or subsequent image frame;
         identifying cells within the image frame for which the metric of change exceeds a change threshold;
         for each identified cell, determining a number of adjacent cells for which the metric of change exceeds the change threshold; and
         storing the metric of change for each cell as motion metadata related to the current image frame,
         wherein the motion metadata further comprises, for each identified cell, the number of adjacent cells for which the metric of change exceeds the change threshold;
   setting a first region of interest of a scene depicted by the encoded video;
   setting a first motion threshold;
   accessing the stored motion metadata; and
   identifying image frames for which the metric of change in at least one cell overlapping with the first region of interest exceeds the first motion threshold, thereby identifying motion within the first region of interest.

2. The method according to claim 1, further comprising:
   changing the first motion threshold; and
   identifying image frames for which the metric of change in cells overlapping with the first region of interest exceeds the changed first motion threshold, thereby identifying motion within the first region of interest.

3. The method according to claim 1, further comprising:
   setting a second region of interest of the scene, in addition to or as a replacement for the first region of interest;
   setting a second motion threshold, wherein the first and second motion threshold are the same or different; and
   identifying image frames for which the metric of change in cells overlapping with the second region of interest exceeds the second motion threshold, thereby identifying motion within the second region of interest.

4. The method according to claim 1, wherein each cell spans less than five percent of the image frame.

5. The method according to claim 1, wherein the image frames for which motion metadata is determined corresponds to intra coded frames of the encoded video.

6. A non-transitory computer readable recording medium having recorded thereon program code, which when executed at a device having processing capabilities, is configured to cause the device to perform operations comprising:
   decoding frames of the encoded video, thereby deriving image frames;
   for at least some of the image frames:
      dividing a current image frame into a mesh of cells, each cell comprising multiple image pixels;
      determining a metric of change for each cell by:
         comparing pixel data of each cell with pixel data of a correspondingly positioned cell of a previous and/or subsequent image frame;
         identifying cells within the image frame for which the metric of change exceeds a change threshold;
         for each identified cell, determining a number of adjacent cells for which the metric of change exceeds the change threshold; and
         storing the metric of change for each cell as motion metadata related to the current image frame,
         wherein the motion metadata further comprises, for each identified cell, the number of adjacent cells for which the metric of change exceeds the change threshold;
   setting a first region of interest of a scene depicted by the encoded video;
   setting a first motion threshold;
   accessing the stored motion metadata; and identifying image frames for which the metric of change in at least one cell overlapping with the first region of interest exceeds the first motion threshold, thereby identifying motion within the first region of interest.

7. A method for determining motion metadata for an encoded video, the method comprising:
  decoding frames of the encoded video, thereby deriving image frames;
  for at least some of the image frames:
    dividing a current image frame into a mesh of cells, each cell comprising multiple image pixels;
    determining a metric of change for each cell by:
      comparing pixel data of each cell with pixel data of a correspondingly positioned cell of a previous and/or subsequent image frame;
      identifying cells within the current image frame for which the metric of change exceeds a change threshold;
      for each identified cell, determining a number of adjacent cells for which the metric of change exceeds the change threshold; and
      storing the metric of change for each cell as motion metadata related to the current image frame,
    wherein the motion metadata further comprises, for each identified cell, the number of adjacent cells for which the metric of change exceeds the change threshold.

8. The method according to claim 7, wherein the image frames for which motion metadata is determined corresponds to intra coded frames of the encoded video.

9. A non-transitory computer readable recording medium having recorded thereon program code, which when executed at a device having processing capabilities, is configured to cause the device to perform operations comprising:
  decoding frames of the encoded video, thereby deriving image frames;
  for at least some of the image frames:
    dividing a current image frame into a mesh of cells, each cell comprising multiple image pixels;
    determining a metric of change for each cell by:
      comparing pixel data of each cell with pixel data of a correspondingly positioned cell of a previous and/or subsequent image frame;
      identifying cells within the current image frame for which the metric of change exceeds a change threshold;
      for each identified cell, determining a number of adjacent cells for which the metric of change exceeds the change threshold; and
    storing the metric of change for each cell as motion metadata related to the current image frame,
    wherein the motion metadata further comprises, for each identified cell, the number of adjacent cells for which the metric of change exceeds the change threshold.

10. A video processing device comprising:
  a decoder configured to decode frames of an encoded video into image frames; and
  a processing circuitry configured to execute a motion meta data deriving operation on image frames decoded by the decoder, wherein the motion meta data deriving operation comprises:
    a dividing function configured to divide a current image frame into a mesh of cells, wherein each cell comprises multiple image pixels;
    a comparison function configured to determine a metric of change for each cell by comparing pixel data of each cell with pixel data of a correspondingly positioned cell of a previous and/or subsequent image frame;
    a cell identification function configured to:
      identify cells within the current image frame for which the metric of change exceeds a change threshold, and
      for each identified, determine a number of adjacent cells for which the metric of change exceeds the change threshold; and
    a storing function configured to store the metric of change for each cell as the motion metadata related to the current image frame,
    wherein the cell identification function is further configured to add the determined number of adjacent cells for which the metric of change exceeds the change threshold as part of the motion metadata for the identified cell.

11. The video processing device according to claim 10, wherein the video processing device form part of a video storage server configured to store the encoded video, the video processing device further comprising:
  a resource monitor configured to determine available processing power for the processing circuitry, and upon the available processing power being above a threshold instruct the motion meta data deriving operation to determine the motion metadata.

12. The video processing device according to claim 10, wherein the video processing device comprises at least part of a client computer, the video processing device further comprising:
  a transceiver configured to download the encoded video from an external source device,
  wherein the storing function is further configured to upload the motion metadata to the external source device.

* * * * *